United States Patent
Townsend

(10) Patent No.: US 6,616,521 B1
(45) Date of Patent: Sep. 9, 2003

(54) METHOD AND MEANS FOR CREATING A CASING ON A SAUSAGE MAKING MACHINE

(76) Inventor: Ray T. Townsend, 3131 Fleur Dr., Des Moines, IA (US) 50321

(*) Notice: Subject to any disclaimer, the term of this patent is extended or adjusted under 35 U.S.C. 154(b) by 0 days.

(21) Appl. No.: 10/183,651

(22) Filed: Jun. 27, 2002

(51) Int. Cl.[7] ............................................... A22C 11/00
(52) U.S. Cl. ........................................... 452/32; 452/30
(58) Field of Search ........................... 452/30, 35, 32, 452/51, 21

(56) References Cited

U.S. PATENT DOCUMENTS

| | | |
|---|---|---|
| 2,575,467 A | 11/1951 | Reichel et al. |
| 4,660,255 A | 4/1987 | Townsend et al. |
| 4,689,854 A * | 9/1987 | Wakefield et al. ............. 452/47 |
| 5,074,822 A * | 12/1991 | Stanley ......................... 452/30 |
| 5,273,482 A * | 12/1993 | Beckman et al. ............. 452/39 |

* cited by examiner

Primary Examiner—Charles T. Jordan
Assistant Examiner—Judith A. Nelson

(57) ABSTRACT

A method and means for creating a casing on a sausage making machine involves the method steps and apparatus wherein a strip of thermoplastic casing material is wound on a rotating hollow sausage stuffing horn. The casing material has side edges forming a series of contiguous helixes of casing material with the side edges of one helix overlapping the side edges of an adjacent helix. A source of heat is applied on at least a helical portion of the adjacent overlapping edges of adjacent helixes to cause the overlapping side edges adjacent the source of heat to fuse together to create a hollow casing. The source of heat is applied to only a short helical path superimposed only over a corresponding helical segment of the overlapping side edges of adjacent helixes.

7 Claims, 4 Drawing Sheets

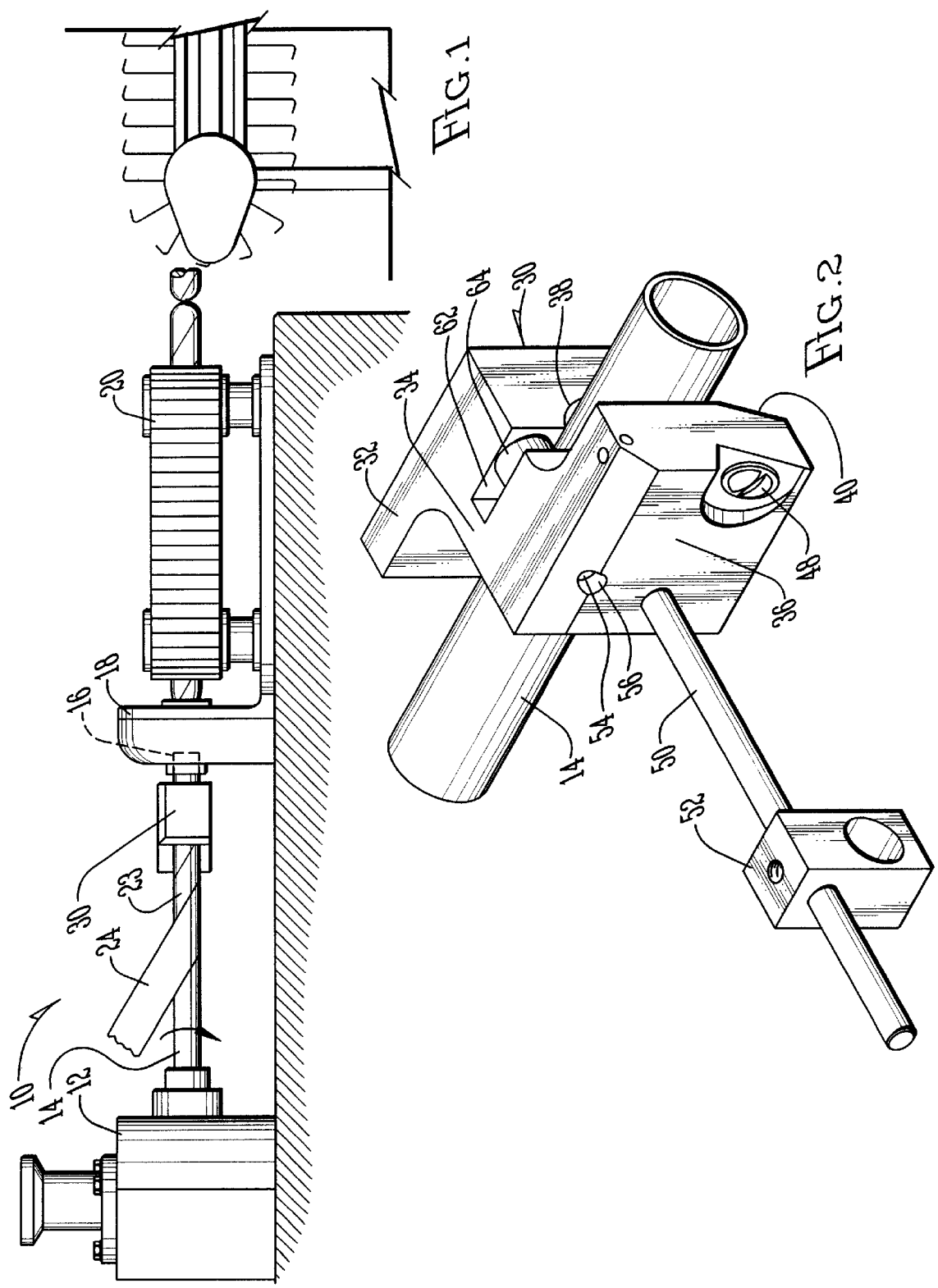

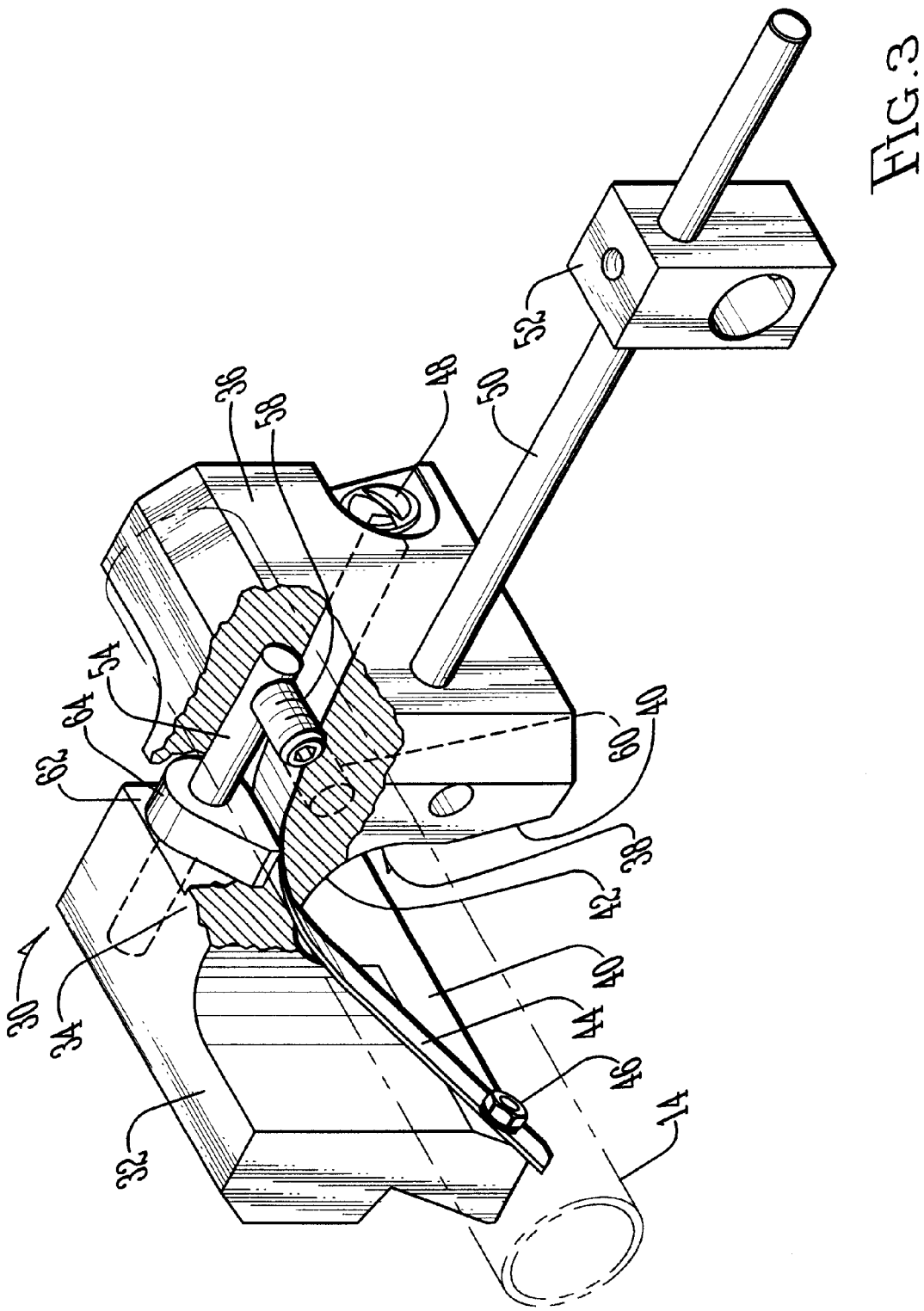

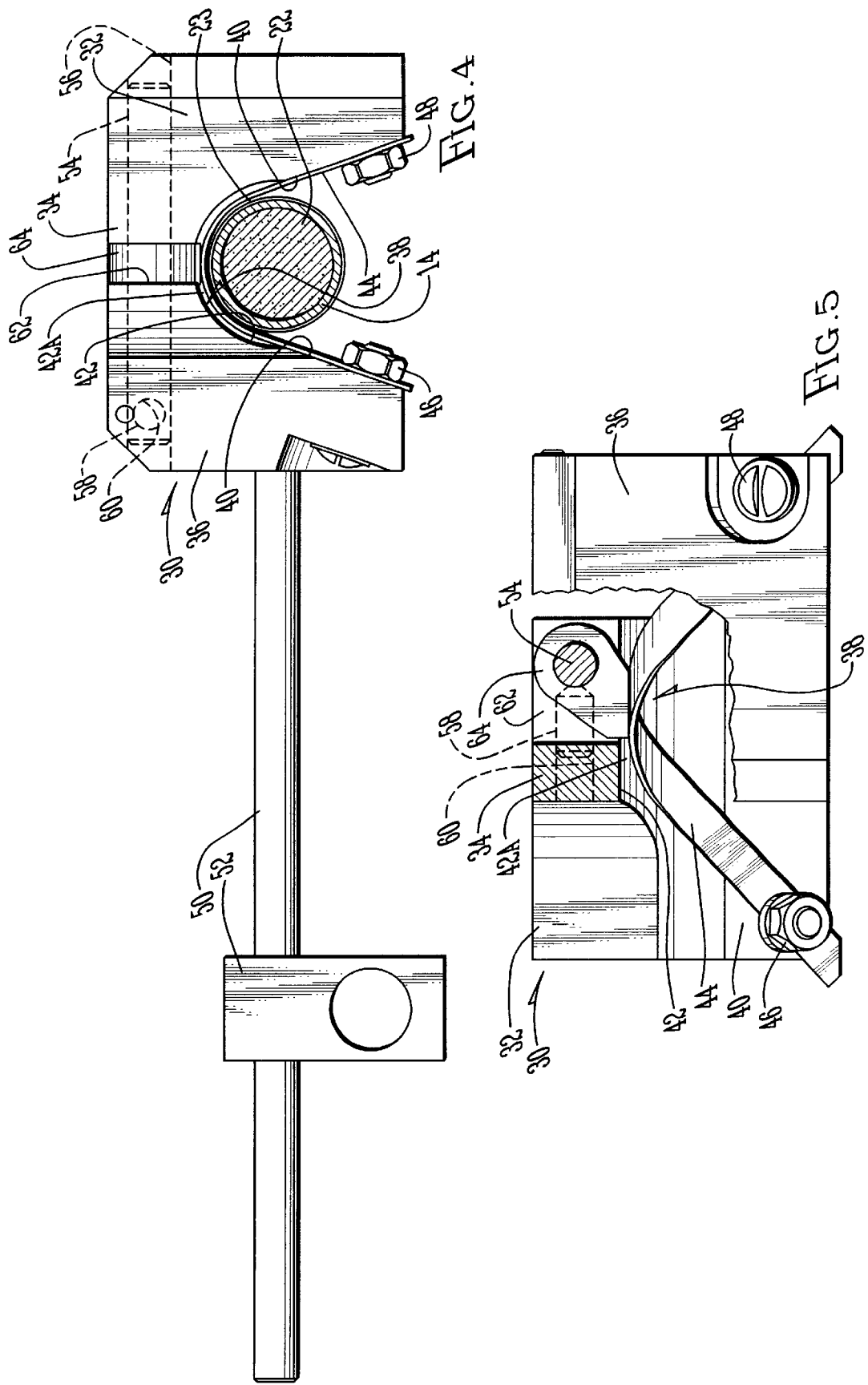

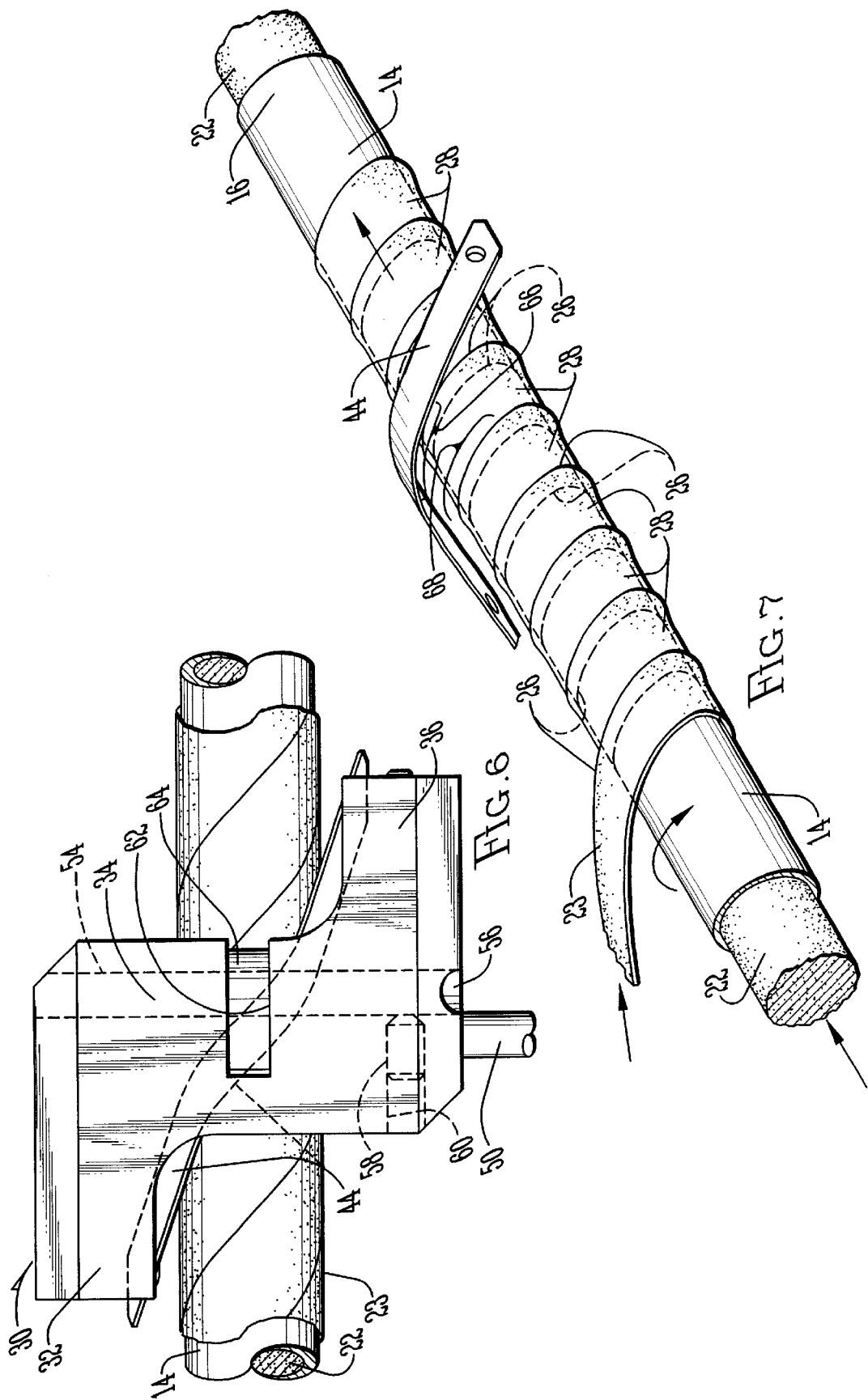

METHOD AND MEANS FOR CREATING A CASING ON A SAUSAGE MAKING MACHINE

BACKGROUND OF THE INVENTION

It is known to create a casing for a sausage making machine (e.g. U.S. Pat. No. 4,660,255) by extending a thin strip of casing material in a helical configuration around an elongated stuffing tube or horn. The side edges of the strip overlap as the helix or spiral configuration is formed. The overlapping edges are thereupon secured together by various means, such as adhesive, or the application of heat, to form a hollow cylindrical casing into which meat emulsion is extruded as the completed casing slides over the discharge end of the stuffing horn as meat emulsion passes therefrom.

However, adhesives are hard to apply, expensive, and some have negative edible characteristics. Also, the application of heat to the overlapped edges is also difficult and has not proven successful either with adhesives or with thermoplastic casing strips.

Therefore, a principal object of this invention is to provide a method and means for creating a casing on a sausage making machine which can effectively heat and fuse overlapping edges of a helix-type casing by applying a concentrated amount of heat along a short helical segment of the casing.

These and other objects will be apparent to those skilled in the art.

SUMMARY OF THE INVENTION

A method and means for creating a casing on a sausage making machine involves the method steps and apparatus wherein a strip of thermoplastic casing material is wound on a rotating hollow sausage stuffing horn. The casing material has side edges forming a series of contiguous helixes of casing material with the side edges of one helix overlapping the side edges of an adjacent helix. A source of heat is applied on at least a helical portion of the adjacent overlapping edges of adjacent helixes to cause the overlapping side edges adjacent the source of heat to fuse together to create a hollow casing. The source of heat is applied to only a short helical path superimposed only over a corresponding helical segment of the overlapping side edges of adjacent helixes.

DESCRIPTION OF THE DRAWINGS

FIG. 1 is a schematic view of the device of this invention;

FIG. 2 is an enlarged scale side perspective view of the device of this invention;

FIG. 3 is a perspective view of the invention opposite to that of FIG. 2;

FIG. 4 is a side elevational view thereof;

FIG. 5 is a side elevational view of the heat block;

FIG. 6 is a top plan view of the heat block; and

FIG. 7 is an enlarged scale perspective view of the stuffing horn and the helical casing with a heat band in an exploded location.

DESCRIPTION OF THE PREFERRED EMBODIMENT

With reference to FIG. 1, the sausage making machine 10 includes a pump 12 and a conventional rotating sausage stuffing horn 14. The horn has a discharge end 16 from which the sausage emulsion is discharged. The numeral 18 designates a conventional twister which twists the filled casing, and the numeral 20 designates a conventional linker which transforms the filled casing into links of sausage. The numeral 22 (FIG. 7) designates the sausage strand passing through and from the stuffing horn from the pump 12.

With reference to FIG. 7, a casing 23 is comprised of a strip of casing material 24 provided to the horn 14 in a helical configuration by any convenient means (see U.S. Pat. No. 4,660,255). The strip 24 of casing 23 has side edges 26 which overlap side edges of an adjacent helix 28 wherein the casing 23 is comprised of a plurality of helix portions 28.

A metallic heat block 30 which is heat conducting has a rearward lateral side segment 32, a central portion 34 and a forward lateral side segment 36 (FIGS. 2 and 3). An inverted U-shaped cross sectional lower opening 38 is formed in the lower portion of block 30 and is defined primarily by tapered side walls 40 and an upper arcuate surface 42 which creates a space 42A which will be discussed hereafter. A helically shaped heating band 44 has a helical configuration identical to the overlapping side edges 26 of casing 23. The heating band 44 has a rearward end that is secured to the lower portion of rearward lateral side segment 32 of block 30. Similarly, the heating band 44 has a forward end that is secured by screw 48 to the lower forward lateral side segment 36 of block 30. As seen in FIG. 7, the band 44 mirrors the helical configuration of the side edges 26 of the casing 23 which engage the inner side of band 42 as best seen in FIGS. 3 and 4.

A balancing rod 50 extends from a suitable aperture in block 30. A sliding balancing element 52 is mounted on rod 30 and can be moved to any convenient position on rod 50 to counteract the rotational motion imparted to block 30 by the rotating stuffing horn 14 and the rotating casing 23. A suitable set screw (not shown) can be used in conjunction with balancing element 52 to locate it in any desired predetermined position.

A cylindrical conventional heating element 54 connected to a source of power (not shown) is disposed in bore 56 of heating block 30 (FIGS. 3 and 4). A set screw 58 can be inserted in bore 60 to hold the cylindrical heating element 54 in place within bore 56. A longitudinal slot 62 centered over bore opening 38 is formed in the top forward portion of block 32 and intersects bore 56. A metal link 64 is pivotally mounted on heating element 54 within slot 62 as best shown in FIG. 3. The slot 62 is in communication with the space 42A in the upper portion of opening 38. The casing 23 is comprised of a thermoplastic material which when suitably heated can adhere to itself when portions thereof are in an overlapping condition. The strip casing material 24 is helically wound on the outer surface of stuffing horn 14 in accordance with the teachings of U.S. Pat. No. 4,660,255. The casing 23 formed into a plurality of helixes 28 with overlapping side edges 26 progressively moves along in a forwardly direction on the outer surface of stuffing horn 14 in accordance with the teachings of the above mentioned patent. The overlapping helixes come into contact with the lower surface of the heating band 44 as shown in FIGS. 4 and 7. The pivotal metal link 64 readily transfers heat from the heating element 54 to the top outside surface of the heating band 30 as best shown in FIG. 4 and serves also to keep the heating band in intimate contact with the outer surface of the overlapped edges 26 of the casing 23.

The heating element 54 also conducts heat downwardly through the body of block 30 and into the screws 46 and 48, and thence into the lower ends of the heating element as best shown in FIG. 4.

It is therefore seen that this invention will subject a short helical segment 68 of the casing to a concentrated source of heat along the short helical path 66 which corresponds to the configuration of helical segments 68 to afford a quick and effective fusion of the overlapping edges along the helical path 66. The continuous contact of the rotating casing with the heating band therefor allows the total helical length of the overlapping seams to be fused together.

It is therefore seen that this invention will accomplish at least all of its stated objectives.

I claim:

1. A method of forming a hollow sausage casing on a rotating sausage stuffing horn during a sausage making process, comprising, helically winding a strip of thermoplastic casing material having side edges onto the rotating sausage stuffing horn to form a series of contiguous helixes of casing material with the side edges of one helix overlapping the side edges of an adjacent helix, applying a source of heat on at least a helical portion of the adjacent overlapping edges of adjacent helixes to cause the overlapping side edges adjacent the source of heat to fuse together to create a hollow casing, and confining the application of the source of heat to only a short helical path superimposed only over a corresponding helical segment of the overlapping side edges of adjacent helixes.

2. The method of claim 1 wherein the source of heat is applied by placing a helical-shaped heating element over a helical segment of the overlapping side edges of adjacent helixes wherein the shape of the heating element has the same helical configuration as the helical segment of the overlapping side edges of the adjacent helixes.

3. A method of making sausages utilizing a hollow sausage casing on a rotating sausage stuffing horn during a sausage making process, comprising, helically winding a strip of thermoplastic casing material having side edges on the rotating sausage stuffing horn to form a series of contiguous helixes of casing material with the side edges of one helix overlapping the side edges of an adjacent helix, applying a source of heat on at least a helical portion of the adjacent overlapping edges of adjacent helixes to cause the overlapping side edges adjacent the source of heat to fuse together to create a hollow casing, confining the application of the source of heat to only a short helical path superimposed only over a corresponding helical segment of the overlapping side edges of adjacent helixes, moving the casing formed by fusing together the overlapping side edges of the helixes from the stuffing horn over a sausage emulsion discharge end thereof, and extruding sausage out of the discharge end of the stuffing horn into the formal casing end.

4. An apparatus for creating a casing on a sausage making machine comprising, an elongated hollow rotatable stuffing horn for receiving meat emulsion and extruding the same through a discharge end into a sausage casing, means for helically winding a strip of thermoplastic casing material having side edges in overlapping condition onto the outer surface of the stuffing horn to form a series of contiguous helixes of casing material with the side edges of one helix overlapping the side edges of an adjacent helix, means for applying a source of heat on at least a helical portion of the adjacent overlapping side edges of adjacent helixes to cause the overlapping side edges adjacent the source of heat to fuse together to create a hollow casing, said means for applying a source of heat comprising a helical shaped heating element over a short segment of the overlapping side edges of the helixes while the stuffing horn is rotated to apply a concentrated source of heat to the overlapping edges while they pass through a confined area between the outer surface of the stuffing horn and a helical surface of the heating element.

5. The apparatus of claim 4 wherein the helical shaped heating element is supported in a helical configuration by a heating block that dwells over the stuffing tube.

6. An apparatus for creating a casing on a sausage making machine comprising:

an elongated hollow rotatable stuffing horn for receiving meat emulsion and extruding the same through a discharge end into a sausage casing;

means for helically winding a strip of thermoplastic casing material having side edges in overlapping condition onto the outer surface of the stuffing horn to form a series of contiguous helixes of casing material with the side edges of one helix overlapping the side edges of an adjacent helix;

means for applying a source of heat on at least a helical portion of the adjacent overlapping side edges of adjacent helixes to cause the overlapping side edges adjacent the source of heat to fuse together to create a hollow casing;

said means for applying a source of heat comprising a helical shaped heating element over a short segment of the overlapping side edges of the helixes while the stuffing horn is rotated to apply a concentrated source of heat to the overlapping edges while they pass through a confined area between the outer surface of the stuffing horn and a helical surface of the heating element, and a balancing element secured to the means for applying a source of heat to counteract any rotational force exerted upon the means for applying a source of heat by the rotating stuffing horn and the rotating casing thereon.

7. An apparatus for creating a casing on a sausage making machine comprising:

an elongated hollow rotatable stuffing horn for receiving meat emulsion and extruding the same through a discharge end into a sausage casing;

means for helically winding a strip of thermoplastic casing material having side edges in overlapping condition onto the outer surface of the stuffing horn to form a series of contiguous helixes of casing material with the side edges of one helix overlapping the side edges of an adjacent helix;

means for applying a source of heat on at least a helical portion of the adjacent overlapping side edges of adjacent helixes to cause the overlapping side edges adjacent the source of heat to fuse together to create a hollow casing;

said means for applying a source of heat comprising a helical shaped heating element over a short segment of the overlapping side edges of the helixes while the stuffing horn is rotated to apply a concentrated source of heat to the overlapping edges while they pass through a confined area between the outer surface of the stuffing horn and a helical surface of the heating element, and wherein a transversely extending heating device extends through the block above the stuffing horn, and a pivotal link is mounted on the heating device and engages the top of the means for applying a source of heat which in turn is in intimate contact with an overlapping segment of the helixes of the helical casing.

\* \* \* \* \*